(12) United States Patent
Rudin et al.

(10) Patent No.: US 9,305,401 B1
(45) Date of Patent: Apr. 5, 2016

(54) REAL-TIME 3-D VIDEO-SECURITY

(71) Applicant: COGNITECH, INC., Pasadena, CA (US)

(72) Inventors: Leonid I. Rudin, San Marino, CA (US); Ping Yu, Los Angeles, CA (US)

(73) Assignee: Cognitech, Inc., Pasadena, CA (US)

( * ) Notice: Subject to any disclaimer, the term of this patent is extended or adjusted under 35 U.S.C. 154(b) by 0 days.

(21) Appl. No.: 13/963,185

(22) Filed: Aug. 9, 2013

Related U.S. Application Data

(63) Continuation of application No. 12/135,101, filed on Jun. 6, 2008, now abandoned.

(60) Provisional application No. 60/942,386, filed on Jun. 6, 2007.

(51) Int. Cl.
*G06K 9/00* (2006.01)
*G06T 19/00* (2011.01)
*H04N 13/04* (2006.01)
*G06T 15/08* (2011.01)
*G06T 17/00* (2006.01)

(52) U.S. Cl.
CPC ............. *G06T 19/006* (2013.01); *G06T 15/08* (2013.01); *G06T 17/00* (2013.01); *H04N 13/0447* (2013.01)

(58) Field of Classification Search
USPC .................... 382/154, 285; 345/419–427; 348/42–60, 143–160
See application file for complete search history.

(56) References Cited

U.S. PATENT DOCUMENTS

| | | | |
|---|---|---|---|
| 6,573,912 B1 * | 6/2003 | Suzuki .................. G06T 7/0065 345/419 |
| 7,352,386 B1 * | 4/2008 | Shum et al. ..................... 348/42 |
| 7,522,186 B2 * | 4/2009 | Arpa et al. ..................... 348/153 |
| 7,583,275 B2 * | 9/2009 | Neumann et al. ............. 345/633 |
| 7,633,520 B2 * | 12/2009 | Samarasekera et al. ...... 348/152 |
| 8,106,968 B1 * | 1/2012 | Rudin et al. .................. 348/241 |
| 8,630,460 B2 * | 1/2014 | Brown et al. ................. 382/103 |
| 8,717,091 B2 * | 5/2014 | Lai et al. ....................... 327/540 |
| 2003/0085992 A1 * | 5/2003 | Arpa et al. ........................ 348/47 |
| 2004/0105573 A1 * | 6/2004 | Neumann et al. ............. 382/103 |
| 2007/0263000 A1 * | 11/2007 | Krupnik et al. ............... 345/473 |
| 2008/0062167 A1 * | 3/2008 | Boggs et al. .................. 345/419 |
| 2008/0198159 A1 * | 8/2008 | Liu et al. ....................... 345/420 |

* cited by examiner

*Primary Examiner* — Aaron W Carter
(74) *Attorney, Agent, or Firm* — Klein, O'Neill & Singh, LLP

(57) ABSTRACT

An image analysis technology that enables real-time fully 3-dimensionally integrated reconstruction of the live video-data derived from CCTV system's multiple camera observations of a spatially connected surveillance scene.

5 Claims, 2 Drawing Sheets

Cameras

Fused 3-D wireframe

REAL-TIME 3-D VIDEO-SECURITY

CROSS-REFERENCE TO RELATED APPLICATION(S)

This application claims the benefit of U.S. Provisional Application Ser. No. 60/942,386, filed Jun. 6, 2007, the contents of which are hereby incorporated by reference in their entirety.

BACKGROUND

This invention relates generally to video processing, and more particularly to video processing of images provided by multiple cameras.

The traditional way of representing closed circuit television (CCTV) data on a single or multiple video monitors with spatially disjointed camera-views results in non-physical disconnection of the geometrically connected 3-dimensional observation scene. This way of rendering the video-data is not optimal, and it implies that the required number of CCTV observers be linearly proportional to the number of cameras in the system.

SUMMARY OF THE INVENTION

A three-dimensional scene utilizing camera images is provided in aspects of the invention. In one aspect the invention provides a process, performed by a computer, for providing a three-dimensional scene having camera images, comprising mapping images from a plurality of cameras to a three-dimensional model; projecting video images from the cameras to the three-dimensional model; and displaying the video images as a three-dimensional scene.

These and other aspects are more fully comprehended upon review of this disclosure.

DETAILED DESCRIPTION

Figure 1:
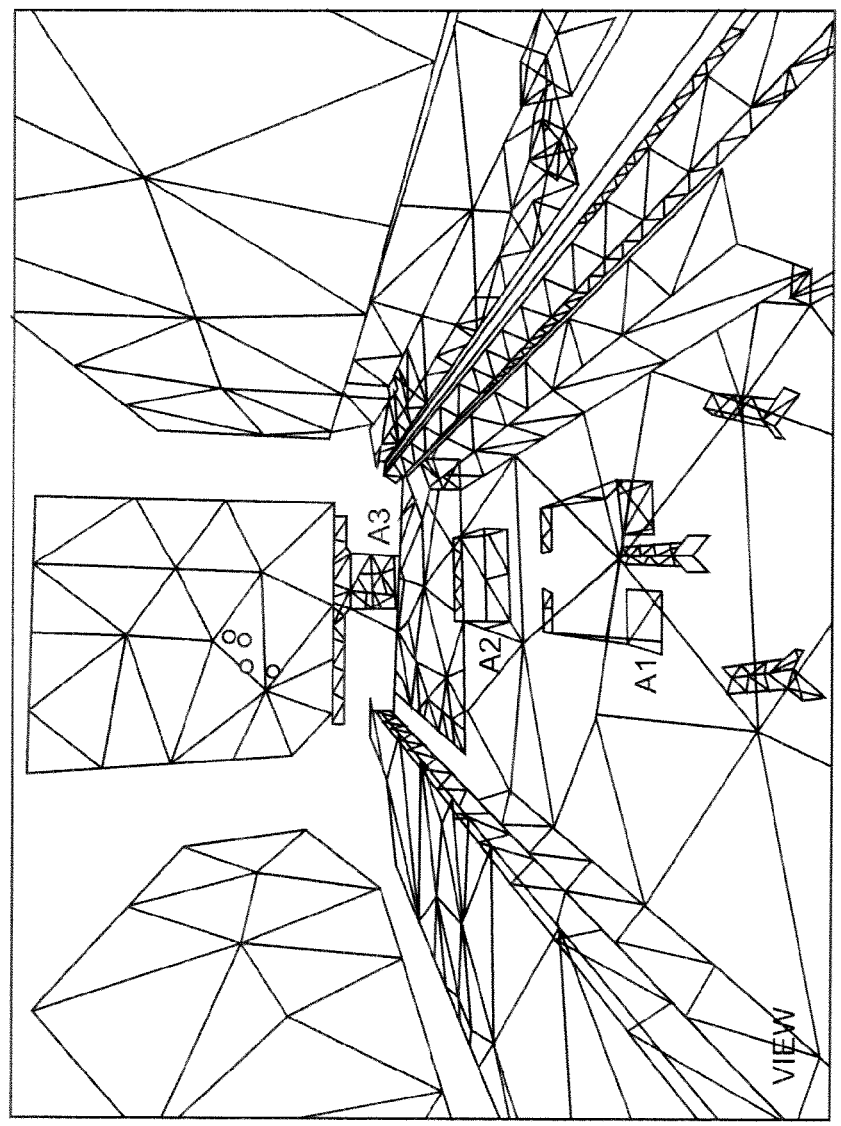
FIG. 1 shows a three-dimensional wire frame of a scene and camera images relating to the scene.
Figure 1:
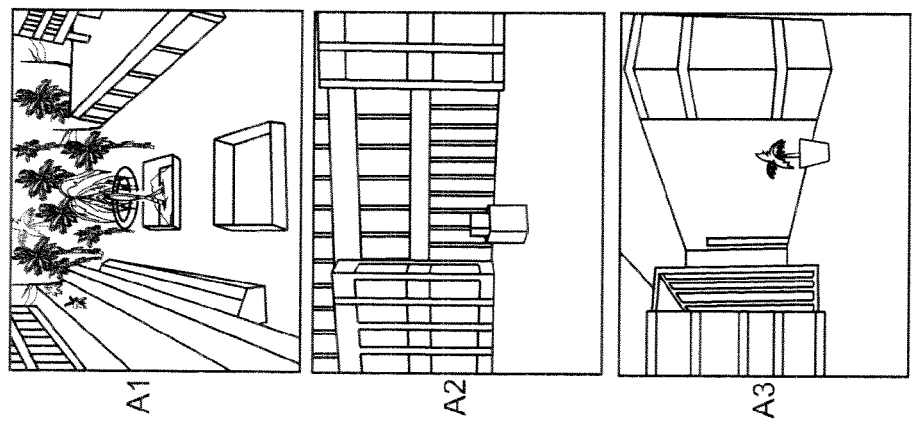
Figure 2:
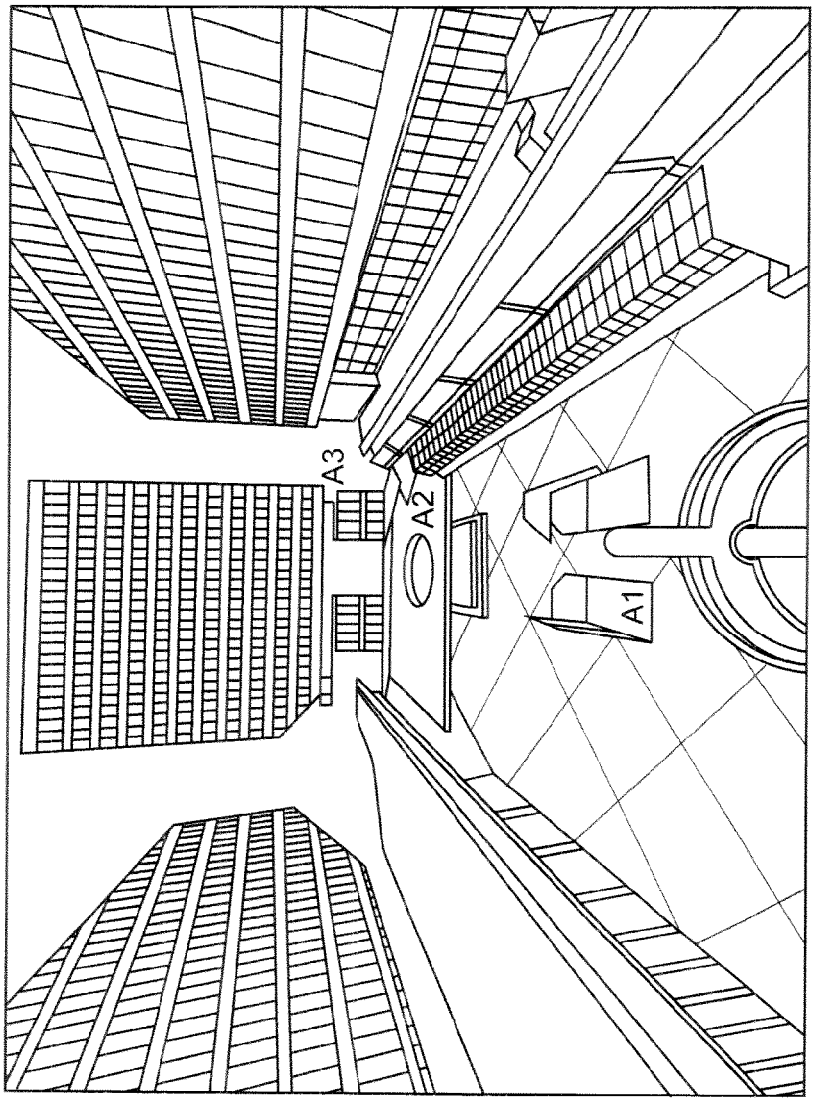
FIG. 2 shows a plate-fused three dimensional scene utilizing camera images.
Figure 2:
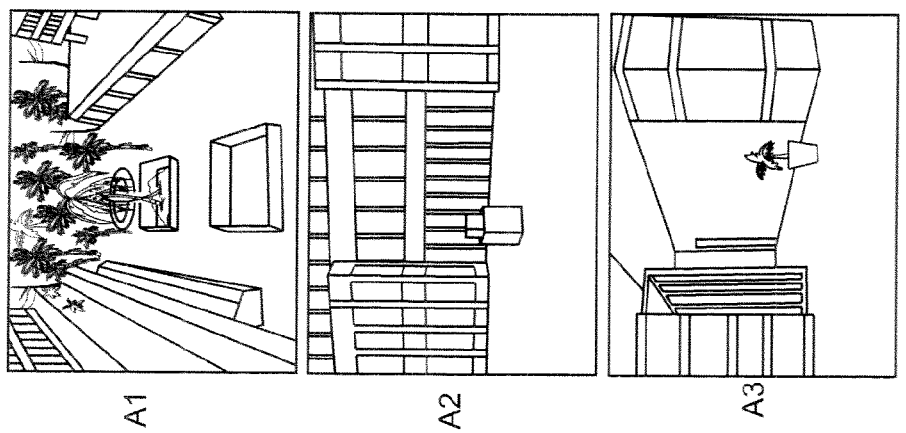

An image analysis technology that provides 3-dimensionally accurate integrated representation of the live video-data derived from a multiple camera observations of a spatially connected 3-dimensional surveillance scene. The combined multi-camera mosaic representation is rendered as a simultaneous mapping of the live observed video-streams onto a 3-D solid model, extracted from the cameras observations. The resulting reconstruction rendering can be virtually toured through, 3-D zoomed, rotated and panned for a convenience of the observation. Computational methods and related software tools simultaneously extract the 3-D structure of the observed scene, spatially co-calibrate all the CCTV cameras on this scene, dynamically co-register, texture map, and render the live video sequences onto the derived 3-D solid model of the CCTV observed space. Due to the nature of this spatially unified scene rendering, the number of required security personnel can be significantly reduced, the observation itself will become more 3D physical, thus more reliable.

In some embodiments a process in accordance with aspects of the invention builds a 3-D model right on top of the photographs of the site of interest.

3-D model is fit to the single or multiple photographs.

The fitting algorithm may '3-D Model Bundle Adjustment', where the 'entire 3-D model is 'best fit'. E.g. least square (or non-linear). Instead of fitting only point sets to the picture, force the solution may be forced to be a predetermined 'shape', e.g. a cube, parallelepiped, sequence of such shapes preconnected (like entire building with offices and staircases), the process determines correct dimensions of the shape constituents and their relative connectivity and location. This process can be called 'Fast 3-D planning'.

Once the 3-D Model is designed and the multiple cameras are turned on, match the cameras to the 3D Model by calibrating the cameras (using Camera Calibration through Automatic Recognition for example), identifying correspondences in camera views and the 3D Model (like corners, lines, features), and computing cameras position with the respect to the model (Projection Map computation). Calibration of cameras may be performed, for example, as discussed in U.S. patent application Ser. No. 12/034,596, the disclosure of which is incorporated by reference herein.

Once the cameras are matched to the 3D Model, project live video streams from each camera onto the 3D Model. Each camera project real time into the virtual 3D, thus obtaining a 3D video.

Each video stream may be distortion corrected in real time using Auto Calibration.

All video observation are correctly fused ('stitched) in 3D thus rendering unified simultaneous view of the entire or any part of the scene with live changes if camera is covering that part.

The 3D rendering of the video streams onto the 3D model undergoes Shadow Mapping, when each camera is projected onto the correct surface (i.e. no video penetrate several surfaces and gets replicated improperly).

3D of the moving, non-stationary objects, e.g. people, cars can be 3D rendered as 'vertical' objects' by first detecting changes in time, extracting regions of change, rendering each region of change as it was 'vertical', i.e. normal to the surface on which it is detected. Thus if we change the observer view, the person observed by the camera does not get projected onto the floor, but will be correctly rendered in the vertical direction. As another example, a height of an object in a scene may be calculated using information from a single camera by use of intersection of the object with a plane of an item of a known position, such as a ground plane, and the trigonometric relationship between camera position, ground plane position, camera angle to intersection and camera angle to another point on the object. In addition, in some embodiments a height, for example a height of six feet or some other height, is assumed for a person or objects of a shape of person. In some embodiments a depth of a person is also calculated using triangulation from information from a plurality of cameras.

Continuous tracking of objects as they cross from one camera view to another.

In some embodiments 3D Model Data base is Cellular: individual built models are co-located using Geo-coordinates (longitude, latitude angles)

In some embodiments multi-scale layers of image data may be used to render 3-D video using just the right level of detail for the viewer position (viewer can move through the 3D scene and observe video scene from different positions).

In some embodiments fast 3D Rendered incrementally loads only the needed 3D and video data, which is determined by the viewer position.

In some embodiments the 3D video may be combined with Google Earth, Microsoft Local Geo-viewers to embed video.

Embodiments using Geo-coordinates to label 3D models it is appropriate to embed our 3D+Video models into the Geo-viewer.

In some embodiments an end-user can connect to his security site via internet, e.g. clicking on the GoogleEarth location and navigating 3D+Video viewer over the internet.

The invention therefore provides for a three-dimensional scene utilizing camera images. Although the invention has been described with respect to certain embodiments, it should be recognized that the invention may be practical other than as specifically described.

What is claimed is:

1. A process, performed by a computer, for providing a three-dimensional scene having camera images from a plurality of cameras, comprising:
   receiving one or more images of the three dimensional scene from at least one of the plurality of cameras;
   fitting and sizing a plurality of predetermined connected three-dimensional shapes within the image of the three dimensional scene;
   generating a three-dimensional model of the three-dimensional scene based, at least partially, on the plurality of predetermined connected three-dimensional shapes;
   projecting live video images from the plurality of cameras, including the at least one of the plurality of cameras, to the three-dimensional model; and
   displaying the video images as a three-dimensional surveillance scene.

2. The process of claim 1, wherein at least one of the plurality of predetermined connected three-dimensional shapes comprises one or more surfaces, the process further comprising:
   detecting changes on a first surface over time in live video images from at least one camera;
   extracting a region of change; and
   rendering the region of change normal to the surface.

3. The process of claim 2, wherein a height of the region of change is determined based, at least partially, on one or more of:
   a ground plane;
   an intersection of the region of change with the ground plane;
   a first camera position;
   a second camera position;
   a first angle of the first camera;
   a second angle of the second camera; and
   the first surface.

4. The process of claim 1, further comprising computing a position of a first video camera with respect to the three-dimensional model.

5. The process of claim 1, wherein the plurality of connected predetermined shapes are connected using a bundle adjustment fitting algorithm.

* * * * *